United States Patent
Onishi et al.

(10) Patent No.: US 7,247,292 B2
(45) Date of Patent: *Jul. 24, 2007

(54) ALUMINUM HYDROXIDE AND PRODUCTION PROCESS THEREOF

(75) Inventors: Akira Onishi, Yokohama (JP); Shirou Tomitsuka, Yokohama (JP); Seisuke Takahashi, Yokohama (JP)

(73) Assignee: Showa Denko K.K., Tokyo (JP)

( * ) Notice: Subject to any disclaimer, the term of this patent is extended or adjusted under 35 U.S.C. 154(b) by 653 days.

This patent is subject to a terminal disclaimer.

(21) Appl. No.: 10/380,048

(22) PCT Filed: Jun. 21, 2002

(86) PCT No.: PCT/JP02/06202

§ 371 (c)(1),
(2), (4) Date: Mar. 11, 2003

(87) PCT Pub. No.: WO03/000591

PCT Pub. Date: Jan. 3, 2003

(65) Prior Publication Data

US 2003/0185747 A1    Oct. 2, 2003

Related U.S. Application Data

(60) Provisional application No. 60/300,852, filed on Jun. 27, 2001.

(30) Foreign Application Priority Data

Jun. 21, 2001    (JP) .............................. 2001-188814

(51) Int. Cl.
*C01F 7/06*    (2006.01)
*C01F 7/18*    (2006.01)

(52) U.S. Cl. ..................... 423/629; 423/119; 423/121; 423/127

(58) Field of Classification Search ................ 423/127, 423/629, 121, 119
See application file for complete search history.

(56) References Cited

U.S. PATENT DOCUMENTS

| | | | | | |
|---|---|---|---|---|---|
| 3,832,442 | A | * | 8/1974 | Emerson | 423/111 |
| 4,340,579 | A | * | 7/1982 | Greber et al. | 423/625 |
| 4,512,959 | A | * | 4/1985 | Pohland et al. | 423/121 |
| 5,130,113 | A | * | 7/1992 | Kitayama et al. | 423/629 |

FOREIGN PATENT DOCUMENTS

| | | |
|---|---|---|
| EP | 0 407 595 A | 1/1991 |
| EP | 1 112 961 A | 7/2001 |
| JP | 62-9256 B2 | 2/1987 |
| JP | 05-4336 B2 | 1/1993 |
| JP | 09-208740 A | 8/1997 |
| WO | WO 01 00529 A | 1/2001 |

OTHER PUBLICATIONS

Gerson A R et al., "Influence of Solution Constituents, Solution Conditioning and Seeding on the Crystalline Phase of Aluminum Hydroxide Using In Situ X-Ray Diffraction." Journal of Crystal Growth, North-Holland Publishing Co. Amsterdam, NL, vol. 160, No. 3, Mar. 1, 1996, pp. 346-354, XP002151672.
Database WPI., Section Ch, Week 199737. Derwent Publications Ltd., London, GB; AN 1997-399664, XP002151673.
Database WPI., Section Ch. Week 199109. Derwent Publications Ltd., London, GB; AN 1991-060921, XP002216509.

* cited by examiner

*Primary Examiner*—Wayne A. Langel
*Assistant Examiner*—James Fiorito
(74) *Attorney, Agent, or Firm*—Sughrue Mion, PLLC

(57) ABSTRACT

A method for producing aluminum hydroxide includes a step of elevating a temperature of a slurry of aluminum hydroxide suspended in a sodium aluminate solution from 70° C. or lower to 85° C. or higher, and a step of applying a centrifugal force to the slurry. The aluminum hydroxide constituting the slurry is obtained beforehand through the Bayer's process.

7 Claims, No Drawings

ALUMINUM HYDROXIDE AND PRODUCTION PROCESS THEREOF

CROSS REFERENCE TO RELATED APPLICATIONS

This application is an application filed under 35 U.S.C. § 111(a) claiming the benefit pursuant to 35 U.S.C. § 119(e)(1) of the filing date of U.S. Provisional Application No. 60/300,852 filed Jun. 27, 2001 pursuant to 35 U.S.C. §111(b).

TECHNICAL FIELD

The present invention relates to aluminum hydroxide that is employed as flame-retardant filler or a similar material for use in plastics, rubber, etc., and to a method for producing the aluminum hydroxide. More particularly, the invention relates to aluminum hydroxide that has been disintegrated to thereby form separate, individual particles without causing unfavorable phenomena, such as roughening of particle surfaces and chipping of the particles, and to a method for producing the aluminum hydroxide.

BACKGROUND ART

Conventionally, aluminum hydroxide has been employed as filler for fulfilling various functions in rubber/plastics. For example, aluminum hydroxide is added, as a flame retardant, to thermoplastic resins, rubber or epoxy resins, and is added, as color-controlling filler, to thermosetting resins, such as unsaturated polyester resins and acrylic resins.

When aluminum hydroxide is employed as a flame retardant, flame retardation performance is enhanced as the amount of aluminum hydroxide is increased. However, addition of a large amount of aluminum hydroxide elevates the torque required for kneading and the molding temperature, thereby causing problematic foaming due to dehydration of a portion of aluminum hydroxide. When aluminum hydroxide is added to thermosetting resins, an increase in the amount of the added aluminum hydroxide reduces material costs, but material strength problematically decreases.

In order to prevent decrease in material strength, particle size is desirably reduced to be as small as possible. Although aluminum hydroxide particles having a small particle size can be yielded through precipitation, addition of a large amount of such small particles serving as filler is difficult, since aluminum hydroxide forms agglomerated secondary particles, which are formed through agglomeration of a large number of primary particles, and exhibits considerably high absorption of oil. Accordingly, aluminum hydroxide particles having a particle size of approximately 50 to 150 μm are pulverized by means of a ball mill or other pulverizer to thereby form approximately primary particles, which are generally employed as filler.

However, pulverizing the particles to a predetermined particle size through a pulverization technique requires a large amount of energy. In addition, aluminum hydroxide primary particles yielded through pulverization are caused to break, thereby causing roughening of particle surfaces, chipping of the particles, etc. As a result, the BET specific surface area of the resultant powder increases. Thus, such powder has poor compatibility with resin and increases the viscosity of the resin containing the powder, failing to attain high-density incorporation of the powder. When the powder is added to a thermosetting resin, the curing time of the resin is prolonged.

On the basis of these tendencies, aluminum hydroxide ideal for serving as filler is thought to have a small surface roughness, i.e., a small BET specific surface area, and to form separate, individual particles.

JP-B HEI 5-4336 discloses a method for disintegrating agglomerated secondary particles by application of strong centrifugal force by means of a continuous screw decanter without breaking the corresponding primary particles, thereby preventing roughening of surfaces of the primary particles. However, the above method is limited to applications of a specific raw material. That is, the method cannot be applied to a wide range of materials.

JP-B SHO 62-9256 discloses a method for producing single-crystalline or roundish aluminum hydroxide particles by bringing a temperature-elevated Bayer extract into contact with solid aluminum hydroxide. However, the above method has drawbacks in that it requires a long period of contact time and that dissolution of aluminum hydroxide during contact is promoted, thereby deteriorating production efficiency.

JP-A HEI 9-208740 discloses a method for reducing the BET specific surface area of aluminum hydroxide particles by pulverizing in advance agglomerated aluminum hydroxide secondary particles by means of a dry-impact pulverizer, adding the pulverized product into a sodium aluminate solution having a predetermined alkaline concentration to thereby form a slurry, and elevating the temperature of the slurry to thereby dissolve the particle surfaces. However, the method also has a drawback in that aluminum hydroxide has to be filtered and dried in order to effect dry pulverization performed in advance, thereby prolonging production steps and elevating production costs.

Accordingly, an object of the present invention is to provide aluminum hydroxide ideal for serving as filler, the aluminum hydroxide having a small BET specific surface area over a wide particle size range and forming separate, individual particles.

Another object of the invention is to provide a method for effectively producing the aluminum hydroxide.

In view of the foregoing, the present inventors have carried out extensive studies in order to attain the above objects, and have found that ideal aluminum hydroxide having a small specific surface area suitable for serving as filler and forming separate, individual particles can be produced through a combination of a first step of elevating the temperature of a slurry under predetermined conditions, which slurry is yielded by suspending aluminum hydroxide in a specific sodium aluminate solution, and a second step of applying a centrifugal force to the slurry to thereby form a sediment having an elevated solid content and disintegrate agglomerated secondary particles. The present invention has been accomplished on the basis of this finding.

DISCLOSURE OF THE INVENTION

Accordingly, the present invention provides a method for producing aluminum hydroxide comprising a step of elevating a temperature of a slurry of aluminum hydroxide suspended in a sodium aluminate solution from 70° C. or lower to 85° C. or higher, the aluminum hydroxide having been obtained through the Bayer's process, and a step of applying a centrifugal force to the slurry.

The present invention further provides a method for producing aluminum hydroxide comprising elevating a temperature of a slurry of aluminum hydroxide suspended in a sodium aluminate solution from 70° C. or lower to 85° C. or higher, the aluminum hydroxide having been obtained through the Bayer's process, and subsequently applying a centrifugal force to the slurry.

In each of the methods, the slurry temperature elevation is conducted within 15 minutes.

In any one of the methods, the sodium aluminate solution has a ratio A/C of an alumina concentration A (g/liter) to a sodium hydroxide concentration C (g/liter) of 0.45 or less.

In any one of the methods, the aluminum hydroxide has a percent dissolution, due to the slurry temperature elevation, of less than 15%, the percent dissolution being represented by the following formula:

Percent dissolution (%)=$C$ (before temperature elevation)×{$A/C$ (after temperature elevation)−$A/C$ (before temperature elevation)}×1.53/slurry concentration (before temperature elevation)×100, wherein $A$ represents the alumina concentration (g/liter) of the sodium aluminate solution and $C$ represents the sodium hydroxide concentration (g/liter) of the sodium aluminate solution.

In any one of the methods, the centrifugal force is at least 300 G.

In any one of the methods, the centrifugal force is applied by means of a continuous screw decanter.

In any one of the methods, the slurry temperature elevation is performed using a double-tube heat exchanger serving as a temperature elevation apparatus employed in the step for elevating the temperature.

The present invention also provides aluminum hydroxide produced through any one of the methods described above, which has a mean particle size D of 1 to 25 μm; a BET specific surface area S of 1.5 m²/g or less; and a ratio $D/D_{bet}$ (agglomeration degree) of D to a particle size D of less than 3, the particle size $D_{bet}$ being a sphere-equivalent particle size calculated on the basis of $D_{bet}=6/(s\times\rho)$, wherein ρ represents the density of aluminum hydroxide.

The present invention also provides an aluminum hydroxide composition comprising, as filler, the aluminum hydroxide just mentioned above.

The aluminum hydroxide composition comprises a matrix material of rubber or plastic.

As described above, by applying thermal impact to aluminum hydroxide and selectively affecting the grain boundary of the agglomerated secondary particles by crystallographically weak cohesive force, it is possible to obtain aluminum hydroxide having a small specific surface area and forming separate, individual particles, which is suitable for filler.

BEST MODE FOR CARRYING OUT THE INVENTION

The present invention will next be described in more detail.

The present invention provides a method for producing aluminum hydroxide comprising a step for elevating the temperature of a slurry of aluminum hydroxide suspended in a sodium aluminate solution from 70° C. or lower to 85° C. or higher, the aluminum hydroxide having been obtained through the Bayer's process, and a step for applying a centrifugal force to the slurry.

The present invention also provides a method for producing aluminum hydroxide comprising elevating the temperature of a slurry of aluminum hydroxide suspended in a sodium aluminate solution from 70° C. or lower to 85° C. or higher, the aluminum hydroxide having been obtained through the Bayer's process, and subsequently applying a centrifugal force to the slurry.

In other words, the present invention is directed to a method for producing aluminum hydroxide comprising a first step and a second step in combination. In the first step of elevating the temperature of a slurry of aluminum hydroxide (obtained through the Bayer's process) suspended in a sodium aluminate solution from 70° C. or lower to 85° C. or higher, thermal impact is applied to the aluminum hydroxide, thereby selectively affecting interfaces between the primary particles that constitute agglomerated secondary particles (hereinafter referred to simply as particle interfaces), which are agglomerated by crystallographically weak cohesive force, to thereby disintegrate the agglomerated secondary particles. In the second step, a centrifugal force of preferably at least 300 G is applied to the slurry to thereby disintegrate the agglomerated secondary particles by attrition between particles in forming sediment having an elevated solid content and by shearing force exerted onto the solid content in continuously scraping the solid content out of the centrifuge.

The above method can provide aluminum hydroxide having a mean particle size D of 1 to 25 μm; a specific surface area S, as measured through a nitrogen absorption method (BET method), of 1.5 m²/g or less; and a ratio $D/D_{bet}$ (agglomeration degree) of D to a particle size $D_{bet}$ of less than 3, the particle size $D_{bet}$ being a sphere-equivalent particle size calculated from S, i.e., $D_{bet}=6/(S\times\rho)$, wherein ρ represents the density of aluminum hydroxide.

In the method for producing aluminum hydroxide according to the present invention, the period of time during which the temperature is elevated from 70° C. or lower to 85° C. or higher is 15 minutes or shorter, preferably 10 minutes or shorter, more preferably 5 minutes or shorter. Periods of time of longer than 15 minutes are not preferred, since thermal impact required for selectively affecting particle interfaces cannot be provided, and the entirety of the particles is dissolved.

The sodium aluminate solution employed in the present method has a ratio A/C of an alumina ($Al_2O_3$) concentration A (g/liter) to a sodium hydroxide (NaOH) concentration C (g/liter) of 0.45 or less, preferably 0.40 or less, more preferably 0.35 or less. A/C ratio values of higher than 0.45 are not preferred, since aluminum hydroxide in an amount required for affecting particle interfaces through temperature elevation cannot be dissolved.

The percent dissolution of aluminum hydroxide due to temperature elevation in the present method is less than 15%, preferably less than 13%. When the percent dissolution is more than 15%, yield of aluminum hydroxide decreases, thereby deteriorating production efficiency.

The percent dissolution of aluminum hydroxide due to temperature elevation is defined by the following formula:

Percent dissolution (%)=$C$ (before temperature elevation)×{$A/C$ (after temperature elevation)−$A/C$ (before temperature elevation)}×1.53/slurry concentration (before temperature elevation)×100, wherein $A$ represents the alumina concentration (g/liter) of the sodium aluminate solution and $C$ represents the sodium hydroxide concentration (g/liter) of the sodium aluminate solution.

In the present method, temperature is elevated to at least 85° C., preferably at least 90° C., more preferably at least 95° C. When the temperature is lower than 85° C., thermal impact required for selectively affecting particle interfaces cannot be provided, and therefore such a low temperature is not preferred, since dissolution of particles progresses from the surfaces of the particles, thereby deteriorating production efficiency, and the particle surfaces are roughened.

Although the boiling point of a sodium aluminate solution is not constant and varies depending on the sodium hydroxide concentration thereof, a sodium aluminate solution employed in a step of the Bayer's process has a boiling point of approximately 104° C.

In the present method, the temperature of the slurry before the slurry undergoes temperature elevation is 70° C. or lower, preferably 65° C. or lower. Slurry temperatures of higher than 70° C. are not preferred, since thermal impact required for selectively affecting particle interfaces cannot be provided in the course of temperature elevation.

JP-B HEI 5-4336 discloses a method for disintegrating agglomerated secondary particles by application of strong centrifugal force by means of a continuous screw decanter without breaking the corresponding primary particles. This technique is considered to provide the effect of disintegrating agglomerated secondary particles on the basis of the mechanism that the agglomerated secondary particles collide one another while moving under centrifugal force applied to the aluminum hydroxide slurry, thereby causing attrition among the particles. This method is described to be applicable only to raw material aluminum hydroxide having a primary particle size of 1 to 4 µm, and it is described that aluminum hydroxide particles having a primary particle size of 4 µm or more cannot sufficiently enjoy the effect of disintegrating agglomerated secondary particles exerted by centrifugal force.

However, through combination of the disintegrating method by means of a continuous screw decanter and the aforementioned step of disintegrating agglomerated secondary particles of aluminum hydroxide including elevating the temperature of the aforementioned slurry of aluminum hydroxide suspended in a sodium aluminate solution, aluminum hydroxide having a primary particle size of more than 4 µm can be disintegrated to form separate, individual particles without roughening the particle surfaces. Such aluminum hydroxide particles have never been satisfactorily disintegrated by the method disclosed in JP-B HEI 5-4336. The centrifugal force applied in the present method is at least 300 G, preferably at least 500 G. more preferably at least 1,000 G. A centrifugal force of less than 300 G is not preferred, because it is insufficient for disintegrating agglomerated secondary particles.

In the present invention, aluminum hydroxide particles are disintegrated also by shearing force exerted onto an elevated solid content in sediment when continuously scraping the solid content out of the centrifuge.

In the present invention, aluminum hydroxide that has a small BET specific surface area at a desired particle size and forms separate, individual particles can be produced by selecting the primary particle size of agglomerated secondary particles serving as raw material in consideration of the desired particle size realized through dissolution.

The aluminum hydroxide produced according to the present invention is suitably employed as filler for fulfilling various functions. Examples of preferably used matrix material to which a composition containing aluminum hydroxide serving as filler is added include rubber and plastics, such as thermoplastic resins, epoxy resins and thermosetting resins (e.g., unsaturated polyester resins and acrylic resins).

When added to a resin or a similar material, the aluminum hydroxide produced according to the present method may be used singly or in combination of several types of aluminum hydroxide particles having different particle sizes so as to reduce the compound viscosity.

The aluminum hydroxide produced according to the present method may be treated with a conventionally known surface-treating agent. No particular limitation is imposed on the surface-treating agent, and examples include coupling agents, such as silane coupling agents and titanate coupling agents; fatty acids, such as oleic acid and stearic acid; esters thereof; and silicates, such as methyl silicate and ethyl silicate.

The present invention will next be described in more detail using examples, which should not be construed as limiting the invention thereto. In the present invention, physical properties were measured through the following methods.

The mean particle size D of aluminum hydroxide was measured through a laser scattering diffraction method.

The specific surface area S of aluminum hydroxide was measured through a nitrogen absorption method (BET method).

The agglomeration degree of aluminum hydroxide was estimated on the basis of the ratio $D/D_{bet}$ of D to the particle size $D_{bet}$, which is a sphere-equivalent particle size calculated on the basis of $D_{bet}=6/(S\times\rho)$, wherein $\rho$ represents the density of aluminum hydroxide.

The percent dissolution of aluminum hydroxide due to temperature elevation was calculated on the basis of the following formula:

Percent dissolution (%)=C (before temperature elevation)×{A/C (after temperature elevation)−A/C (before temperature elevation)}×1.53/slurry concentration (before temperature elevation)× 100, wherein A represents the alumina concentration (g/liter) of the sodium aluminate solution and C represents the sodium hydroxide concentration (g/liter) of the sodium aluminate solution.

EXAMPLE 1

A slurry of aluminum hydroxide which had been produced through the Bayer's process (mean particle size of aluminum hydroxide: 93.3 µm, sodium hydroxide concentration: 150 g/liter, A/C=0.33, slurry concentration: 220 g/liter, and slurry temperature: 34° C.) was fed to the inner tube of a double-tube heat exchanger (inner tube capacity: 0.019 m$^3$, heat transfer area: 3.2 m$^2$) at 3 m$^3$/hr (residence time in the heat exchanger: 23 seconds). By feeding steam to the outer tube of the heat exchanger, the temperature of the slurry was elevated to 96° C., and a portion of the slurry was fed to a continuous screw decanter (SHARPES SUPER-D-CANTER P-660, product of Tomoe engineering) at 1 m$^3$/hr, so as to apply a centrifugal force (1,000 G) to the slurry to thereby form a sediment having an elevated solid content. The solid content was continuously taken out of the centrifuge using a screw mounted on the inner wall of the centrifuge.

The A/C and percent dissolution of the slurry that had been passed through the double-tube heat exchange were found to be 0.44 and 11.5%, respectively. The aluminum hydroxide that had been passed through the decanter was subjected to washing, separating through filtration, and drying. The thus-yielded aluminum hydroxide was found to have a mean particle size D of 20.0 µm, a BET specific surface area S of 0.3 m$^2$/g, and an agglomeration degree of 2.4.

EXAMPLE 2

A slurry of aluminum hydroxide which had been produced through the Bayer's process (mean particle size of aluminum hydroxide: 76.8 μm, sodium hydroxide concentration: 146 g/liter, A/C=0.38, slurry concentration: 190 g/liter, and slurry temperature: 65° C.) was fed to the inner tube of a double-tube heat exchanger similar to that employed in Example 1 at 3 m$^3$/hr (residence time in the heat exchanger: 23 seconds). By feeding steam to the outer tube of the heat exchanger, the temperature of the slurry was elevated to 96° C., and a portion of the slurry was fed to a continuous screw decanter similar to that employed in Example 1 at 1 m$^3$/hr, so as to apply a centrifugal force (1,000 G) to the slurry to thereby form a sediment having an elevated solid content. The solid content was taken out of the centrifuge in the same manner as in Example 1.

The A/C and percent dissolution of the slurry that had been passed through the double-tube heat exchange were found to be 0.49 and 12.9%, respectively. The aluminum hydroxide that had been passed through the decanter was subjected to washing, separating through filtration, and drying. The thus-yielded aluminum hydroxide was found to have a mean particle size D of 12.4 μm, a BET specific surface area S of 0.4 m$^2$/g, and an agglomeration degree of 2.0.

EXAMPLE 3

A slurry of aluminum hydroxide which had been produced through the Bayer's process (mean particle size of aluminum hydroxide: 20.8 μm, sodium hydroxide concentration: 154 g/liter, A/C=0.35, slurry concentration: 230 g/liter, and slurry temperature: 64° C.) was fed to the inner tube of a double-tube heat exchanger similar to that employed in Example 1 at 3 m$^3$/hr (residence time in the heat exchanger: 23 seconds). By feeding steam to the outer tube of the heat exchanger, the temperature of the slurry was elevated to 97° C., and a portion of the slurry was fed to a continuous screw decanter similar to that employed in Example 1 at 1 m$^3$/hr, so as to apply a centrifugal force (1,000 G) to the slurry to thereby form a sediment having an elevated solid content. The solid content was taken out of the centrifuge in the same manner as in Example 1.

The A/C and percent dissolution of the slurry that had been passed through the double-tube heat exchange were found to be 0.46 and 11.3%, respectively. The aluminum hydroxide that had been passed through the decanter was subjected to washing, separating through filtration, and drying. The thus-yielded aluminum hydroxide was found to have a mean particle size D of 3.3 μm, a BET specific surface area S of 1.3 m$^2$/g, and an agglomeration degree of 1.7.

EXAMPLE 4

A portion of the slurry of Example 2 which had been passed through a double-tube heat exchange was fed to a continuous screw decanter similar to that employed in Example 2 at 1 m$^3$/hr, so as to apply a centrifugal force (500 G) to the slurry to thereby form a sediment having an elevated solid content. The solid content was taken out of the centrifuge in the same manner as in Example 1.

The aluminum hydroxide that had been passed through the decanter was subjected to washing, separating through filtration, and drying. The thus-yielded aluminum hydroxide was found to have a mean particle size D of 13.6 μm, a BET specific surface area S of 0.4 m$^2$/g, and an agglomeration degree of 2.2.

COMPARATIVE EXAMPLE 1

Slurry of aluminum hydroxide similar to that employed in Example 1 was fed to the inner tube of a double-tube heat exchanger similar to that employed in Example 1 at 3 m$^3$/hr (residence time in the heat exchanger: 23 seconds). By feeding steam to the outer tube of the heat exchanger, the temperature of the slurry was elevated to 83° C., and a portion of the slurry was fed to a continuous screw decanter (product of Tomoe engineering) similar to that employed in Example 1 at 1 m$^3$/hr, so as to apply a centrifugal force (1,000 G) to the slurry to thereby form a sediment having an elevated solid content. The solid content was taken out of the centrifuge in the same manner as in Example 1.

The A/C and percent dissolution of the slurry that had been passed through the double-tube heat exchange were found to be 0.35 and 2.1%, respectively. The aluminum hydroxide that had been passed through the decanter was subjected to washing, separating through filtration, and drying. The thus-yielded aluminum hydroxide was found to have a mean particle size D of 80.6 μm, a BET specific surface area S of 0.3 m$^2$/g, and an agglomeration degree of 9.8.

COMPARATIVE EXAMPLE 2

Slurry of aluminum hydroxide which had been produced through the Bayer's process (mean particle size of aluminum hydroxide: 93.3 μm, sodium hydroxide concentration: 147 g/liter, A/C=0.47, slurry concentration: 210 g/liter, and slurry temperature: 63° C.) was fed to the inner tube of a double-tube heat exchanger similar to that employed in Example 1 at 3 m$^3$/hr (residence time in the heat exchanger: 23 seconds). By feeding steam to the outer tube of the heat exchanger, the temperature of the slurry was elevated to 95° C., and a portion of the slurry was fed to a continuous screw decanter similar to that employed in Example 1 at 1 m$^3$/hr, so as to apply a centrifugal force (1,000 G) to the slurry to thereby form a sediment having an elevated solid content. The solid content was taken out of the centrifuge in the same manner as in Example 1.

The A/C and percent dissolution of the slurry that had been passed through the double-tube heat exchange were found to be 0.49 and 2.1%, respectively. The aluminum hydroxide that had been passed through the decanter was subjected to washing, separating through filtration, and drying. The thus-yielded aluminum hydroxide was found to have a mean particle size D of 24.5 μm, a BET specific surface area S of 0.4 m$^2$/g, and an agglomeration degree of 4.0.

COMPARATIVE EXAMPLE 3

A portion of the slurry of Example 1 which had been passed through a double-tube heat exchange was fed to a continuous screw decanter similar to that employed in Example 1 at 1 m$^3$/hr, so as to apply a centrifugal force (100 G) to the slurry to thereby form a sediment having an elevated solid content. The solid content was taken out of the centrifuge in the same manner as in Example 1.

The aluminum hydroxide that had been passed through the decanter was subjected to washing, separating through filtration, and drying. The thus-yielded aluminum hydroxide was found to have a mean particle size D of 30.7 µm, a BET specific surface area S of 0.3 m$^2$/g, and an agglomeration degree of 3.7.

COMPARATIVE EXAMPLE 4

Aluminum hydroxide slurry similar to that of Example 1 was fed to a SUS tank (capacity: 1 m$^3$), and the temperature of the tank was elevated to 85° C. over 30 minutes. Subsequently, the heated slurry was fed to a continuous screw decanter similar Lo that employed in Example 1 at 1 m$^3$/hr, so as to apply a centrifugal force (1,000 G) to the slurry to thereby form a sediment having an elevated solid content. The solid content was taken out of the centrifuge in the same manner as in Example 1.

The A/C and percent dissolution of the slurry contained in the tank, after temperature elevation, were found to be 0.52 and 19.8%, respectively. The aluminum hydroxide that had been passed through the decanter was subjected to washing, separating through filtration, and drying. The thus-yielded aluminum hydroxide was found to have a mean particle size D of 19.8 µm, a BET specific surface area S of 0.3 m$^2$/g, and an agglomeration degree of 2.4.

The results of Examples 1 to 4 and Comparative Examples 1 to 4 are summarized in Table 1 below.

TABLE 1

| | Ex. 1 | Ex. 2 | Ex. 3 | Ex. 4 |
|---|---|---|---|---|
| Al hydroxide raw material characteristics | | | | |
| Mean particle size µm | 93.3 | 76.8 | 20.8 | 76.8 |
| Na aluminate solution characteristics | | | | |
| NaOH concentration g/L | 150 | 146 | 154 | 146 |
| A/C - | 0.33 | 0.38 | 0.35 | 0.38 |
| Slurry characteristics | | | | |
| Slurry concentration g/L | 220 | 190 | 230 | 190 |
| Slurry temperature ° C. | 34 | 65 | 64 | 65 |
| Temp. elevation conditions | | | | |
| Temp. elevated ° C. | 96 | 97 | 96 | 96 |
| Temp. elevation time | 23 sec | 23 sec | 23 sec | 23 sec |
| A/C (after temp. elevation) - | 0.44 | 0.49 | 0.46 | 0.49 |
| Percent dissolution % | 11.5 | 12.9 | 11.3 | 12.9 |
| Centrifugation conditions | | | | |
| Centrifugal force G | 1000 | 1000 | 1000 | 500 |
| Al hydroxide characteristics (after filtration) | | | | |
| Mean particle size D µm | 20.0 | 12.4 | 3.3 | 13.6 |
| BET sp. surface area S m$^2$/g | 0.3 | 0.4 | 1.3 | 0.4 |
| Agglomeration degree | 2.4 | 2.0 | 1.7 | 2.2 |

TABLE 1

| | Comp. Ex. 1 | Comp. Ex. 2 | Comp. Ex. 3 | Comp. Ex. 4 |
|---|---|---|---|---|
| Al hydroxide raw material characteristics | | | | |
| Mean particle size µm | 93.3 | 93.3 | 93.3 | 93.3 |
| Na aluminate solution characteristics | | | | |
| NaOH concentration g/L | 150 | 147 | 150 | 150 |
| A/C - | 0.33 | 0.47 | 0.33 | 0.33 |
| Slurry characteristics | | | | |
| Slurry concentration g/L | 220 | 210 | 220 | 220 |
| Slurry temperature ° C. | 34 | 63 | 34 | 34 |
| Temp. elevation conditions | | | | |
| Temp. elevated ° C. | 83 | 95 | 96 | 85 |
| Temp. elevation time | 23 sec | 23 sec | 23 sec | 30 min |
| A/C (after temp. elevation) - | 0.35 | 0.49 | 0.44 | 0.52 |
| Percent dissolution % | 2.1 | 2.1 | 11.5 | 19.8 |
| Centrifugation conditions | | | | |
| Centrifugal force G | 1000 | 1000 | 100 | 1000 |
| Al hydroxide characteristics (after filtration) | | | | |
| Mean particle size D µm | 80.6 | 24.5 | 30.7 | 19.8 |
| BET sp. surface area S m$^2$/g | 0.3 | 0.4 | 0.3 | 0.3 |
| Agglomeration degree | 9.8 | 4.0 | 3.7 | 2.4 |

INDUSTRIAL APPLICABILITY

According to the production method of the present invention, disintegrating of agglomerated secondary particles of aluminum hydroxide is performed by applying thermal impact to aluminum hydroxide; selectively affecting interfaces between the primary particles that constitute agglomerated secondary particles, which are agglomerated by crystallographically weak cohesive force; and applying centrifugal force so as to attain strong contact between agglomerated secondary particles.

As described hereinabove, differing from conventionally employed pulverization methods making use of impact force generated by attrition of media; grinding methods making use of a mill, such as a Raymond mill; and pulverization methods making use of collision of particles (e.g., jet mill), the method for producing aluminum hydroxide of the present invention is an epoch-making method in that the primary particle surfaces are not roughened during the course of disintegrating. Thus, the aluminum hydroxide produced through the method of the present invention is suitable for filler and is of remarkably great industrial value, since the aluminum hydroxide has a small specific surface area and forms separate, individual particles.

The invention claimed is:

1. A method for producing aluminum hydroxide comprising:
    a step of elevating a temperature of a slurry having agglomerated secondary particles of aluminum hydroxide obtained through the Bayer's process suspended in a sodium aluminate solution from 70° C. or lower to 85° C. or higher within 15 minutes to disintegrate agglomerated secondary particles, and
    a step of applying a centrifugal force to the slurry to disintegrate agglomerated secondary particles by attrition between particles that are formed in a sediment having an elevated solid content.

2. A method for producing aluminum hydroxide comprising:
elevating a temperature of a slurry having agglomerated secondary particles of aluminum hydroxide obtained through the Bayer's process suspended in a sodium aluminate solution from 70° C. or lower to 85° C. or higher within 15 minutes to disintegrate agglomerated secondary particles, and
subsequently applying a centrifugal force to the slurry to disintegrate agglomerated secondary particles by attrition between particles that are formed in a sediment having an elevated solid content.

3. The method according to any one of claims 1 or 2, wherein the sodium aluminate solution has a ratio A/C of an alumina concentration A (g/liter) to a sodium hydroxide concentration C (g/liter) of 0.45 or less.

4. The method according to any one of claims 1 or 2, wherein the aluminum hydroxide has a percent dissolution, due to the slurry temperature elevation, of less than 15%, the percent dissolution being represented by:

Percent dissolution (%) =$C$ (before temperature elevation)×{$A/C$ (after temperature elevation)−$A/C$ (before temperature elevation)}×1.53/slurry concentration (before temperature elevation)× 100, wherein A represents the alumina concentration (g/liter) of the sodium aluminate solution and C represents the sodium hydroxide concentration (g/liter) of the sodium aluminate solution.

5. The method according to any one of claims 1 or 2, wherein the centrifugal force is at least 300 G.

6. The method according to any one of claims 1 or 2, wherein the centrifugal force is applied by means of a continuous screw decanter.

7. The method according to any one of claims 1 or 2, wherein the slurry temperature elevation is performed using a double-tube heat exchanger serving as a temperature elevation apparatus employed in the step for elevating the temperature.

* * * * *